(12) United States Patent
Matsubara et al.

(10) Patent No.: US 9,718,469 B2
(45) Date of Patent: Aug. 1, 2017

(54) VEHICLE DRIVING ASSISTANCE SYSTEM

(75) Inventors: Toshiyuki Matsubara, Gotenba (JP); Shinji Igarashi, Susono (JP); Tomonori Akiyama, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 225 days.

(21) Appl. No.: 14/348,665

(22) PCT Filed: Oct. 3, 2011

(86) PCT No.: PCT/JP2011/072764
§ 371 (c)(1),
(2), (4) Date: Mar. 31, 2014

(87) PCT Pub. No.: WO2013/051082
PCT Pub. Date: Apr. 11, 2013

(65) Prior Publication Data
US 2014/0244151 A1 Aug. 28, 2014

(51) Int. Cl.
*B60W 30/095* (2012.01)
*G08G 1/16* (2006.01)
*B60W 10/18* (2012.01)
*B60W 10/20* (2006.01)
*B60W 30/09* (2012.01)

(52) U.S. Cl.
CPC ........ *B60W 30/0956* (2013.01); *B60W 10/18* (2013.01); *B60W 10/20* (2013.01);
(Continued)

(58) Field of Classification Search
CPC ............ B60W 30/095; B60W 30/0956; G08G 1/165; G08G 1/166

USPC .......................................................... 701/301
See application file for complete search history.

(56) References Cited

U.S. PATENT DOCUMENTS

| 2004/0090117 A1 | 5/2004 | Dudeck et al. |
| 2006/0241827 A1* | 10/2006 | Fukuchi ............... G05D 1/0251 701/23 |

(Continued)

FOREIGN PATENT DOCUMENTS

| JP | 2004-504216 | 2/2004 |
| JP | 2007-204044 | 8/2007 |

(Continued)

*Primary Examiner* — Redhwan k Mawari
*Assistant Examiner* — Anshul Sood
(74) *Attorney, Agent, or Firm* — Finnegan, Henderson, Farabow, Garrett & Dunner, LLP

(57) ABSTRACT

An object of the invention is to provide, in a vehicle driving assistance system that provides assistance to avoid a collision between a host vehicle and a three-dimensional object causing an obstruction, a technique for avoiding assistance in which the host vehicle is guided to a region where the presence of a three-dimensional object is unclear. To achieve this object, according to the invention, a grid map, by which an avoidance region in which a three-dimensional object exists, an unclear region in which the existence of a three-dimensional object is unclear, and a safe region in which no three-dimensional objects exist can be distinguished, is created. When the avoidance region exists on the advancement path of the host vehicle, a route that can avoid the avoidance region and passes through the unclear region for a distance not exceeding a threshold is specified, whereupon a steering angle is controlled to cause the host vehicle to travel along the specified route.

7 Claims, 9 Drawing Sheets

(52) U.S. Cl.
CPC .......... *B60W 30/09* (2013.01); *B60W 30/095* (2013.01); *G08G 1/165* (2013.01); *G08G 1/166* (2013.01); *B60W 2420/42* (2013.01); *B60W 2420/52* (2013.01); *B60W 2520/10* (2013.01); *B60W 2520/14* (2013.01); *B60W 2550/30* (2013.01); *B60W 2710/182* (2013.01); *B60W 2710/202* (2013.01)

(56) References Cited

U.S. PATENT DOCUMENTS

| | | | | |
|---|---|---|---|---|
| 2009/0125204 A1* | 5/2009 | Kudo | .................. | B62D 15/026 |
| | | | | 701/96 |
| 2011/0288684 A1* | 11/2011 | Farlow | .................. | B25J 11/009 |
| | | | | 700/264 |
| 2012/0010772 A1* | 1/2012 | Pack | ...................... | B25J 9/1664 |
| | | | | 701/27 |
| 2012/0035797 A1 | 2/2012 | Oobayashi et al. | | |
| 2012/0173018 A1* | 7/2012 | Allen | ...................... | B25J 13/06 |
| | | | | 700/245 |
| 2014/0303845 A1 | 10/2014 | Hartmann et al. | | |

FOREIGN PATENT DOCUMENTS

| | | |
|---|---|---|
| JP | 2011-150473 A | 8/2011 |
| JP | 2011-150540 | 8/2011 |
| JP | 2012-203806 | 10/2012 |
| WO | WO 02/08010 A1 | 1/2002 |
| WO | WO 2011/064821 A1 | 6/2011 |
| WO | WO 2012/119595 A1 | 9/2012 |

* cited by examiner

VEHICLE DRIVING ASSISTANCE SYSTEM

CROSS-REFERENCE TO RELATED APPLICATIONS

This application is a national phase application of International Application No. PCT/JP2011/072764, filed Oct. 3, 2011, the content of which is incorporated herein by reference.

TECHNICAL FIELD

The invention relates to a technique of providing driving assistance to avoid a three-dimensional object existing on an advancement path of a host vehicle.

BACKGROUND ART

A driving assistance system proposed in the related art detects a three-dimensional object existing in front of a host vehicle, and after predicting contact between the detected three-dimensional object and the host vehicle, issues a warning to a driver and performs an automatic driving operation to avoid contact between the host vehicle and the three-dimensional object.

In a conventional technique employed in a driving assistance system such as that described above, a three-dimensional object existing on the periphery of the host vehicle is detected using a camera, a laser radar, or the like, and steering or braking operation assistance is implemented on the basis of a degree of risk, which is determined in accordance with the type of the three-dimensional object and a time leeway (TTC: Time To Collision) (see Patent Document 1, for example).

SUMMARY OF THE INVENTION

Incidentally, when a three-dimensional object that may cause an obstruction is detected using this conventional technique, sensor detection errors in the camera, laser radar, or the like are taken into account, but regions in which the sensor cannot perform detection and missed detections by the sensor are not taken into account. As a result, assistance to guide the vehicle to a region in which the presence of a three-dimensional object is unclear may be implemented.

The invention has been designed in consideration of the circumstances described above, and an object thereof is to provide a technique employed in a vehicle driving assistance system, with which assistance to guide the vehicle to a region in which the presence of a three-dimensional object is unclear can be avoided.

To solve the problem described above, according to the invention, when a collision between a host vehicle and a three-dimensional object is predicted, a route that can avoid a region in which the three-dimensional object exists and a region in which the presence of a three-dimensional object is unclear is specified, whereupon driving assistance is implemented to cause the host vehicle to travel along the specified route.

More specifically, a vehicle driving assistance system according to the invention includes: recognizing means for recognizing a three-dimensional object existing on a periphery of a host vehicle and generating information relating to relative positions of the three-dimensional object and the host vehicle; setting means for setting, on the basis of the information generated by the recognizing means, a grid map indicating relative positions of a current position of the host vehicle, an avoidance region, which is a region in which the three-dimensional object exists, a safe region, which is a region in which no three-dimensional objects exist, and an unclear region, which is a region in which the presence of a three-dimensional object is unclear; and assisting means for, when an advancement path of the host vehicle passes through the avoidance region on the grid map set by the setting means, specifying an avoidance line, which is a route on which the avoidance region can be avoided, on the basis of a distance by which the route passes through the unclear region or the number of times the route passes through a cell of the unclear region, and modifying a movement amount of the host vehicle such that the host vehicle travels along the specified avoidance line.

With the vehicle driving assistance system according to the invention, when a collision between the host vehicle and the three-dimensional object is predicted, it is possible to set a route (an avoidance line) that can avoid to a maximum extent not only the avoidance region in which the three-dimensional object exists, but also the unclear region in which the presence of a three-dimensional object is unclear. Hence, by modifying the movement amount of the host vehicle such that the host vehicle travels along the avoidance line, implementation of driving assistance in which the host vehicle is guided to the unclear region can be avoided.

Note that here, the "movement amount of the host vehicle" is a movement amount that correlates with a turning energy of the vehicle, such as a yaw rate, a lateral acceleration acting in a left-right direction of the vehicle, or the like, for example.

In the vehicle driving assistance system according to the invention, the setting means may set, in relation to each cell of the grid map, a value (a movement cost) indicating a degree of danger to the host vehicle when traveling through the corresponding cell. At this time, the movement cost of a cell in the avoidance region is set to be larger than the movement cost of a cell in the unclear region, and the movement cost of a cell in the unclear region is set to be larger than the movement cost of a cell in the safe region.

Meanwhile, in the vehicle driving assistance system according to the invention, total movement costs of all cells on respective routes along which the host vehicle is predicted to travel when a steering angle of the host vehicle is varied in increments of a predetermined amount may be calculated, and a route having the smallest total movement cost may be selected as the avoidance line. Note that here, the "predetermined amount" is a minimum amount by which the steering angle can be modified by the assisting means, for example.

According to this method, the route that is least likely to pass through the avoidance region and the unclear region, or in other words the safest route, from among the routes on which the host vehicle can avoid the three-dimensional object, is set as the avoidance line.

Note that a route that passes through the unclear region for a distance exceeding a threshold or a route that passes through the cells of the unclear region a number of times exceeding a threshold may be excluded from the avoidance line selection choices. The reason for this is that when a three-dimensional object exists in the unclear region, the possibility of a collision between the host vehicle and the three-dimensional object in the unclear region increases as the distance by which the host vehicle passes through the unclear region increases.

Here, when the three-dimensional object is not recognized between the host vehicle and a limit position of a recognition range of the recognizing means, the setting means may set cells between the limit position and the host vehicle as the unclear region. Cases in which the recognizing means does not recognize a three-dimensional object between the host vehicle and the limit position include a case in which a three-dimensional object does not actually exist and a case in which detection of a three-dimensional object is missed. When detection of a three-dimensional object is missed and the avoidance line is specified on the assumption that no three-dimensional object exists, the host vehicle may collide with the three-dimensional object following the implementation of driving assistance.

By setting the cells extending from the host vehicle to the limit position as the unclear region, on the other hand, a collision between the host vehicle and a three-dimensional object possibly existing in the unclear region can be avoided in a case where a three-dimensional object is not recognized between the host vehicle and the limit position.

Further, when the three-dimensional object is recognized between the host vehicle and a limit position of a recognition range of the recognizing means, the setting means may set cells between the three-dimensional object and the host vehicle as the safe region. When the recognizing means recognizes a three-dimensional object, it may be considered that no other three-dimensional object exists between the recognized three-dimensional object and the host vehicle. Hence, a collision between the host vehicle and another three-dimensional object can be avoided even when an avoidance line that passes through a cell between the three-dimensional object and the host vehicle is set.

Note that when a three-dimensional object is recognized between the host vehicle and the limit position of the recognition range of the recognizing means, the setting means may set cells extending from the three-dimensional object to the limit position as the unclear region. Here, when a sensor such as a stereo camera or a LIDAR (LIght Detection And Ranging or Laser Imaging Detection And Ranging) is used as the recognizing means, it may be impossible to detect another three-dimensional object existing behind an initial three-dimensional object. Therefore, by setting the cells between the three-dimensional object and the limit position as the unclear region, a situation in which the host vehicle avoids a three-dimensional object but then collides with another three-dimensional object existing behind the initial three-dimensional object can be avoided.

Further, in the vehicle driving assistance system according to the invention, when a route on which the avoidance region can be avoided does not exist, a route on which a distance from the host vehicle to the three-dimensional object is greatest may be selected as the avoidance line. This is effective when a plurality of routes for avoiding a three-dimensional object existing on the advancement path of the host vehicle exist but a collision with another three-dimensional object cannot be avoided on any of these routes. More specifically, by setting the route on which the distance required for the host vehicle to reach another three-dimensional object after avoiding an initial three-dimensional object is greatest as the avoidance line, the time required for the host vehicle to reach the other three-dimensional object increases, and therefore the driver can perform a driving operation for avoiding the other three-dimensional object. Alternatively, the assisting means can operate a braking device so as to reduce damage incurred by a collision between the host vehicle and the other three-dimensional object.

With the vehicle driving assistance system according to the invention, assistance to guide the vehicle to a region in which the presence of a three-dimensional object is unclear can be avoided.

MODES FOR CARRYING OUT THE INVENTION

A specific embodiment of the invention will be described below on the basis of the drawings. In an example described here, the invention is applied to a system that recognizes a travel path of a host vehicle and a three-dimensional object that may cause an obstruction, and provides driving assistance for departing from the recognized travel path and avoiding a collision with the three-dimensional object. Note that configurations described in the following embodiment are merely examples of the invention, and the configuration of the invention is not limited thereto.

Figure 1:
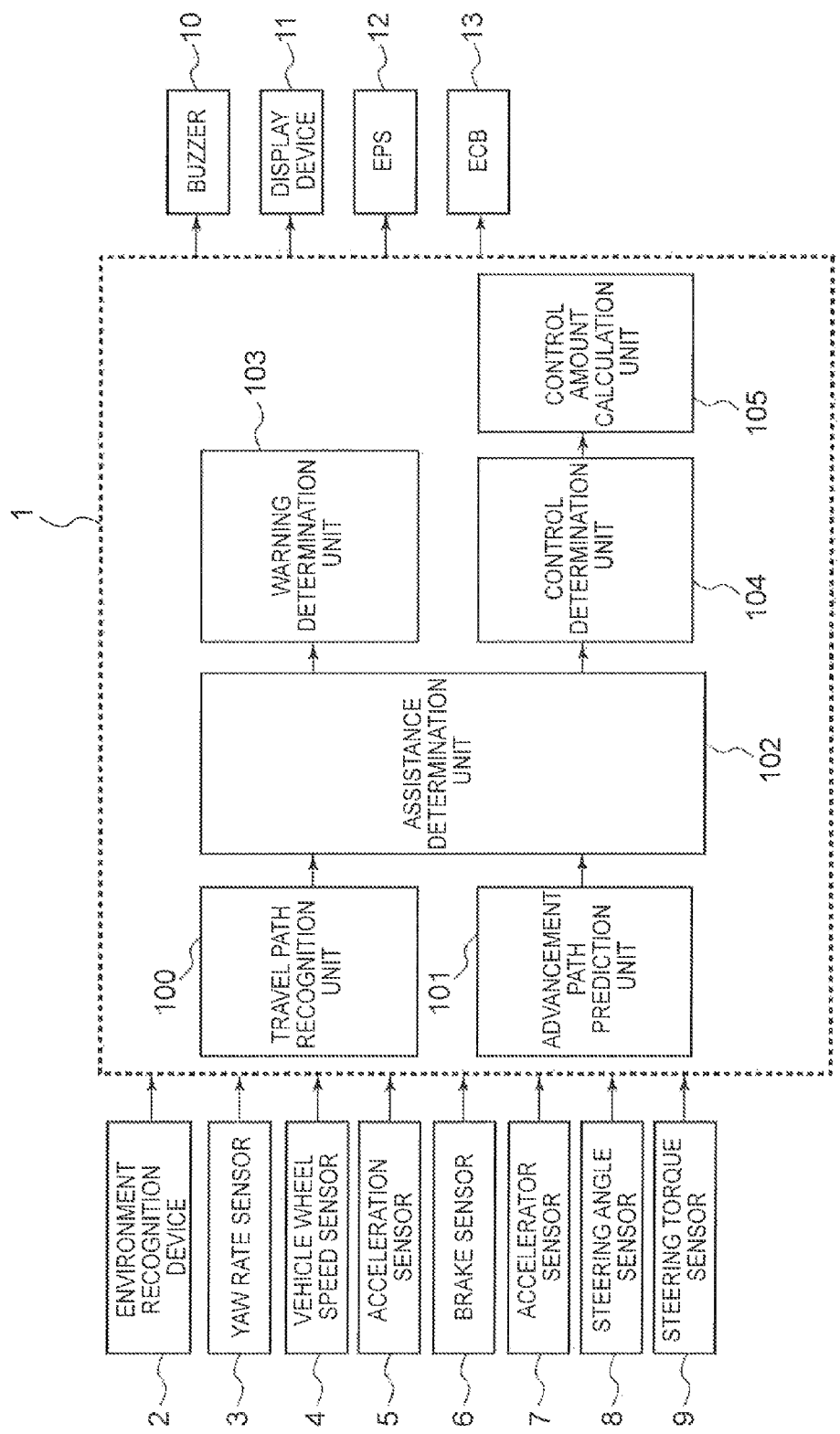
FIG. 1 is a view showing a configuration of a vehicle driving assistance system according to the invention.

FIG. 1 is a block diagram showing a functional configuration of a vehicle driving assistance system to which the invention is applied. As shown in FIG. 1, a driving assistance control unit (ECU) 1 is installed in a vehicle.

The ECU 1 is an electronic control unit including a central processing unit (CPU), a read only memory (ROM), a random access memory (RAM), a backup RAM, an I/O interface, and so on. Various sensors such as an environment recognition device 2, a yaw rate sensor 3, a vehicle wheel speed sensor 4, an acceleration sensor 5, a brake sensor 6, an accelerator sensor 7, a steering angle sensor 8, and a steering torque sensor 9 are electrically connected to the ECU 1 so that output signals from the respective sensors are input into the ECU 1.

The environment recognition device 2 includes at least one measurement device from among a LIDAR (Laser Imaging Detection And Ranging), an LRF (Laser Range Finder), a stereo camera, and so on, for example, and detects information (a relative distance and a relative angle, for example) relating to relative positions of a host vehicle and a three-dimensional object existing on a periphery of the vehicle. The environment recognition device 2 corresponds to recognizing means according to the invention.

The yaw rate sensor 3 is attached to a vehicle body of the host vehicle, for example, and outputs an electric signal correlating with a yaw rate y acting on the host vehicle. The vehicle wheel speed sensor 4 is attached to a vehicle wheel of the host vehicle, and outputs an electric signal correlating with a travel speed (a vehicle speed V) of the vehicle. The acceleration sensor 5 outputs an electric signal correlating with an acceleration (a front-rear acceleration) acting on the host vehicle in a front-rear direction and an acceleration (a lateral acceleration) acting on the host vehicle in a left-right direction.

The brake sensor 6 is attached to a brake pedal in a vehicle cabin, for example, and outputs an electric signal correlating with an operating torque (a depression force) of the brake pedal. The accelerator sensor 7 is attached to an accelerator pedal in the vehicle cabin, for example, and outputs an electric signal correlating with an operating torque (a depression force) of the accelerator pedal. The steering angle sensor 8 is attached to a steering rod connected to a steering wheel in the vehicle cabin, for example, and outputs an electric signal correlating with a rotation angle (a steering angle) from a neutral position of the steering wheel. The steering torque sensor 9 is attached to the steering rod, and outputs an electric signal correlating with a torque (a steering torque) input into the steering wheel.

Further, various devices such as a buzzer 10, a display device 11, an electric power steering (EPS) 12, and an electronically controlled brake (ECB) 13 are connected to the ECU 1 such that these various devices are electrically controlled by the ECU 1.

The buzzer 10 is a device installed in the vehicle cabin, for example, to output a warning sound or the like. The display device 11 is a device installed in the vehicle cabin, for example, to display various messages and a warning light. The electric power steering (EPS) 12 is a device that supplements the steering torque of the steering wheel using torque generated by an electric motor. The electronically controlled brake (ECB) 13 is a device that electrically adjusts an operating oil pressure (a brake oil pressure) of a friction brake provided on each vehicle wheel.

The ECU 1 includes following functions to control these various devices using the output signals from the various sensors described above. The ECU 1 includes a travel path recognition unit 100, an advancement path prediction unit 101, an assistance determination unit 102, a warning determination unit 103, a control determination unit 104, and a control amount calculation unit 105.

The travel path recognition unit 100 generates information relating to a road (a travel path) on which the host vehicle is about to travel on the basis of information output from the environment recognition device 2. For example, the travel path recognition unit 100 generates information relating to grid coordinates indicating positions of three-dimensional objects (for example, a curbstone, a guard rail, a ditch, a wall, poles, other vehicles, or the like extending along a lane edge,) that may cause an obstruction to the host vehicle on a two-dimensional grid map having the host vehicle as an origin, and an attitude (a distance, a yaw angle, and so on) of the host vehicle relative to the three-dimensional objects and a lane boundary.

Figure 2:
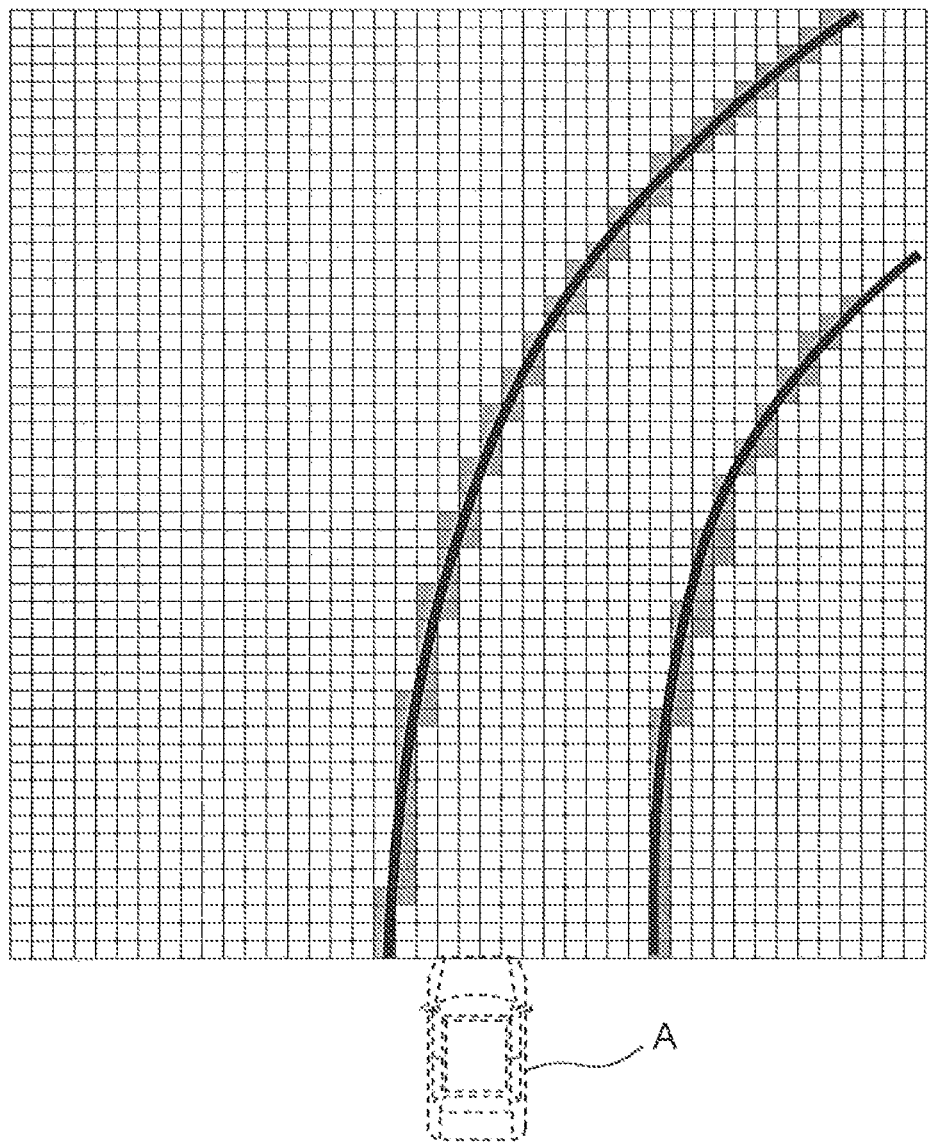
FIG. 2 is a view showing a method of generating a grid map.

A method of generating the grid map will now be described on the basis of FIG. 2. FIG. 2 shows a grid map generated when the road is shaped so as to curve rightward. Two solid lines in FIG. 2 denote respective edges of the road, and have been added to describe the method of creating the grid map.

The travel path recognition unit 100 sets cells in positions where a three-dimensional object recognized by the environment recognition device 2 exists as an avoidance region (a region shaded in a dark color in FIG. 2). Next, the travel path recognition unit 100 sets cells in positions on an imaginary line linking the three-dimensional object detected by the environment recognition device 2 to the host vehicle as a safe region (an unshaded region in FIG. 2). Further, when no three-dimensional object is recognized on an imaginary line linking the host vehicle to a recognizable limit position of the environment recognition device 2 (a frame part of the grid map, for example), the travel path recognition unit 100 sets cells positioned on this imaginary line as an unclear region. Furthermore, the travel path recognition unit 100 sets cells in positions that form dead angles due to the existence of the three-dimensional object (cells positioned behind the three-dimensional object when seen from the host vehicle) as the unclear region (a region shaded in a light color in FIG. 2).

Figure 3:
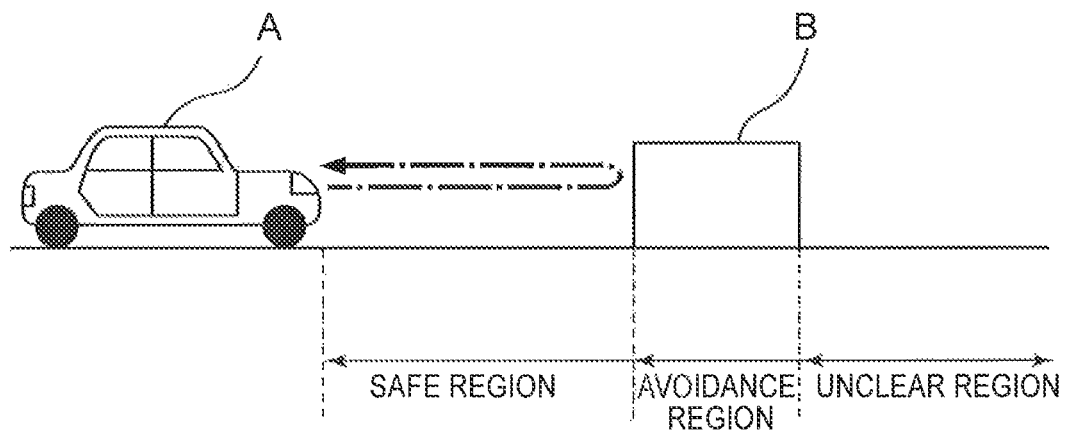
FIG. 3 is a view showing a method of setting an avoidance region and a safe region.

Note that in an initial condition, all of the cells on the grid map are set as the unclear region. As shown in FIG. 3, when the environment recognition device 2 recognizes a three-dimensional object (when, for example, a reflection wave of a radar wave emitted by the environment recognition device 2 returns to the environment recognition device 2), the travel path recognition unit 100 modifies cells corresponding to a position of a three-dimensional object B from the unclear region to the avoidance region, and modifies cells positioned on an imaginary line linking the avoidance region to a host vehicle A from the unclear region to the safe region.

By creating the grid map using this method, when the environment recognition device 2 misses detection of a three-dimensional object or a region in which the environment recognition device 2 cannot perform detection exists, a region in which a three-dimensional object may exist is no longer set as the safe region. Note that the travel path recognition unit 100 corresponds to setting means according to the invention.

The advancement path prediction unit 101 predicts a route (a path) along which the host vehicle is predicted to travel if the host vehicle continues to travel while maintaining a current movement amount. More specifically, the advancement path prediction unit 101 calculates a turning radius R generated if the host vehicle continues to travel while maintaining a current vehicle speed V and a current yaw rate γ, and specifies an advancement path in accordance with the calculated turning radius R and a width of the host vehicle. Note that the turning radius R can be determined by dividing the vehicle speed V by the yaw rate λ (R=V/λ).

Figure 4:
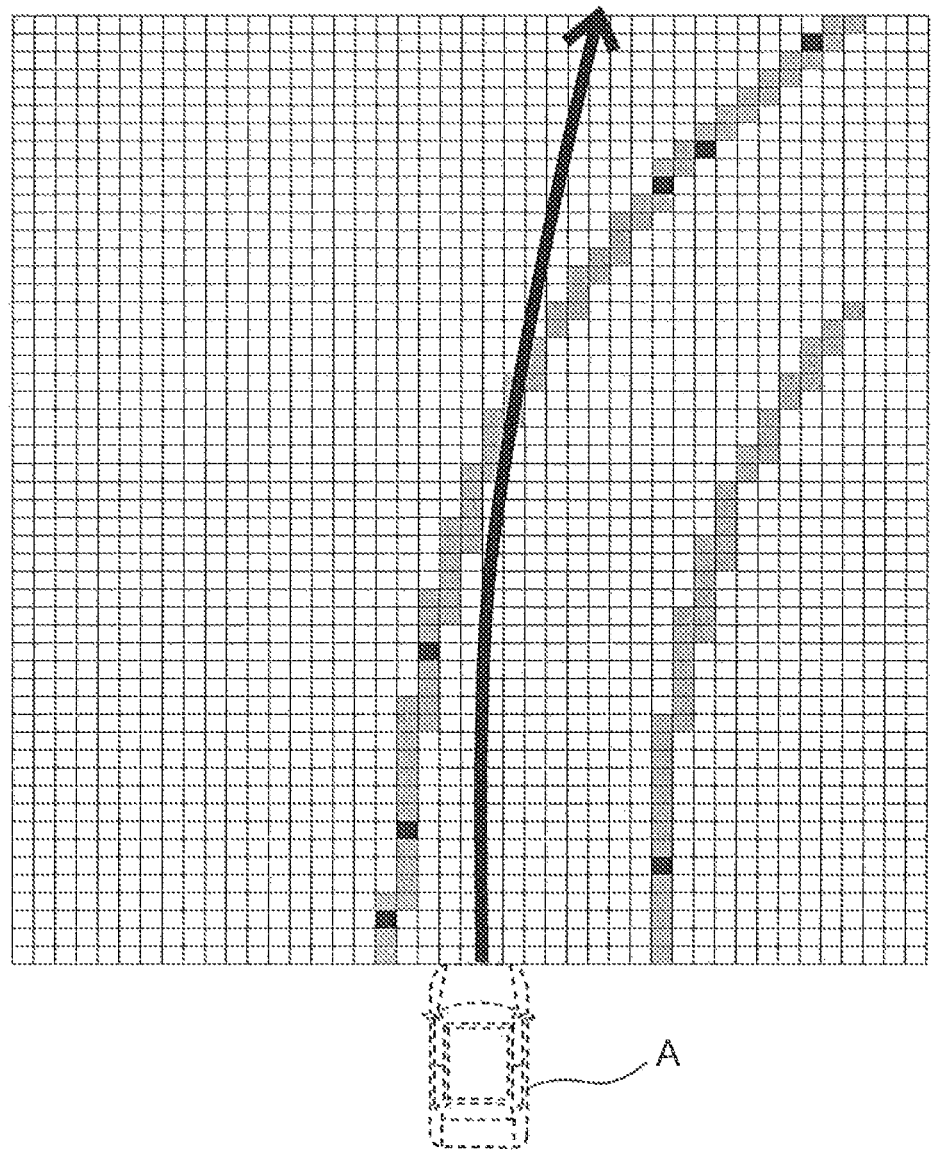
FIG. 4 is a view showing an example in which a three-dimensional object (the avoidance region) exists on an advancement path of a host vehicle.
Figure 5:
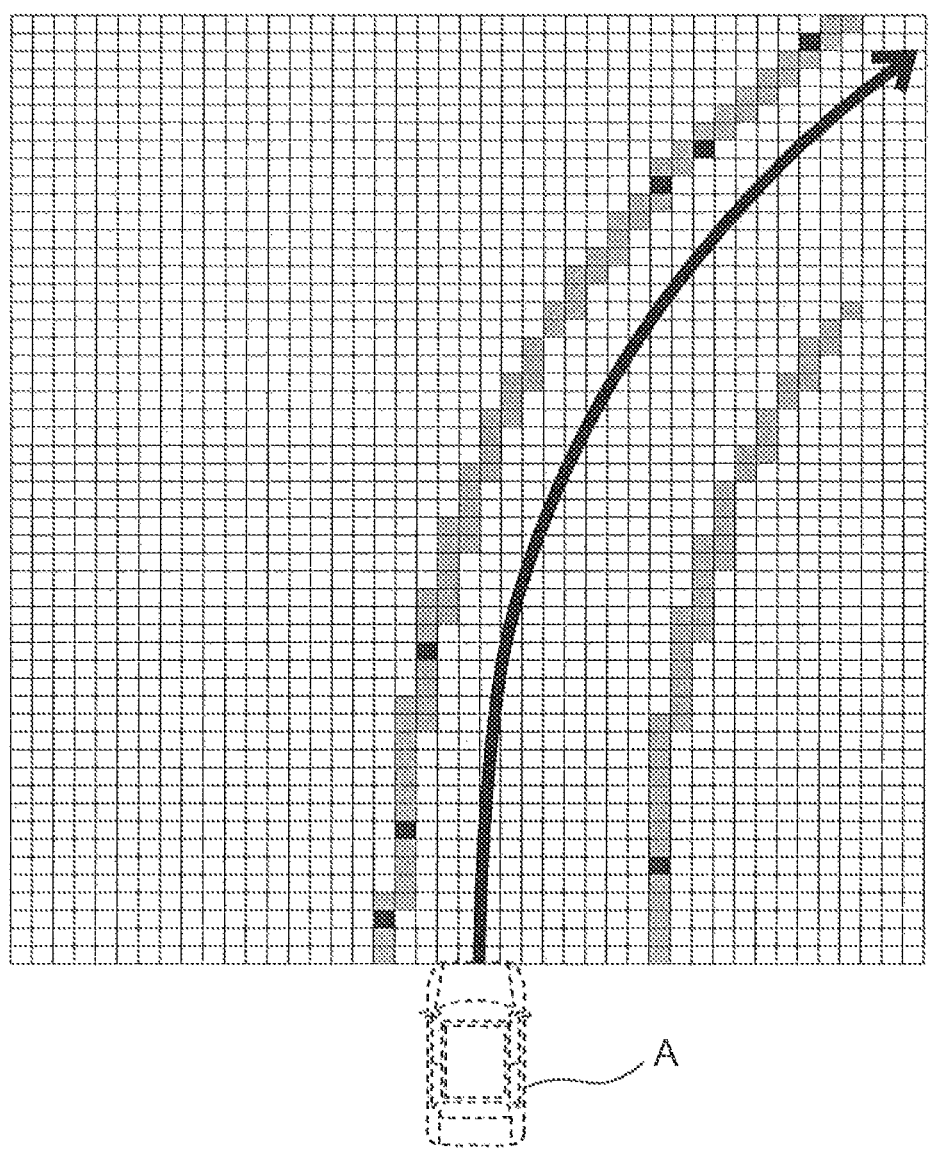
FIG. 5 is a view showing an example in which a three-dimensional object (the avoidance region) does not exist on the advancement path of the host vehicle.

The assistance determination unit 102 determines whether or not to implement driving assistance on the basis of the grid map generated by the travel path recognition unit 100 and the advancement path predicted by the advancement path prediction unit 101. More specifically, the assistance determination unit 102 determines whether or not the advancement path of the host vehicle passes through the avoidance region on the grid map. As shown in FIG. 4, when, at this time, the advancement path (indicated by a solid line arrow in FIG. 4) of the host vehicle A passes through the avoidance region, the assistance determination unit 102 determines that driving assistance implementation is required. As shown in FIG. 5, meanwhile, when the advancement path (indicated by a solid line arrow in FIG. 5) of the host vehicle A does not pass through the avoidance region, the assistance determination unit 102 determines that driving assistance implementation is not required.

The warning determination unit 103 issues a warning to a driver by sounding the buzzer 10, displaying a warning message or a warning light on the display device 11, and so on when the assistance determination unit 102 determines that driving assistance implementation is required. For example, the warning determination unit 103 may sound the buzzer 10 or display a warning message or a warning light on the display device 11 as soon as the assistance determination unit 102 determines that driving assistance implementation is required. Alternatively, the warning determination unit 103 may sound the buzzer 10 or display a warning message or a warning light on the display device 11 at a point where a distance between the host vehicle and the three-dimensional object falls to or below a predetermined distance. Alternatively, the warning determination unit 103 may calculate a time required for the host vehicle A to reach the three-dimensional object B on a route where the distance between the host vehicle and the three-dimensional object is longest, and sound the buzzer 10 or display a warning message or a warning light on the display device 11 at a point where the calculation result becomes equal to or smaller than a predetermined time.

Here, the predetermined distance and the predetermined time may be modified in accordance with the output signal from the yaw rate sensor 3 and the output signal from the vehicle wheel speed sensor 4. For example, the predetermined distance and the predetermined time may be set to be longer when the vehicle speed is high than when the vehicle speed is low. Further, the predetermined distance and the predetermined time may be set to be longer when the yaw rate is large than when the yaw rate is small.

Note that the method of warning the driver is not limited to a method of sounding the buzzer 10 or a method of displaying a warning message or a warning light on the display device 11, and a method of intermittently varying a fastening torque of a seatbelt, for example, may be employed instead.

When the assistance determination unit 102 determines that driving assistance implementation is required, the control determination unit 104 determines a timing at which to automatically implement a driving operation (referred to hereafter as an "avoidance operation") required to avoid a collision between the host vehicle and the three-dimensional object.

More specifically, the control determination unit 104 may set a timing at which the distance between the host vehicle and the three-dimensional object falls to or below a predetermined distance as the avoidance operation implementation timing. Alternatively, the control determination unit 104 may calculate the time required for the host vehicle to reach the three-dimensional object, and set a timing at which the calculation result is equal to or smaller than a predetermined time as the avoidance operation implementation timing. Here, the "avoidance operation" includes an operation to modify the steering angle of the vehicle wheel using the electric power steering (EPS) 12, and may also include an operation to modify a braking force applied to the vehicle wheel using the electronically controlled brake (ECB) 13 and so on.

Note that the predetermined distance and the predetermined time used by the control determination unit 104 may be modified in accordance with the vehicle speed and the yaw rate, similarly to the predetermined distance and the predetermined time used by the warning determination unit 103. Further, it is assumed that the predetermined distance and the predetermined time used by the control determination unit 104 are equal to or smaller than the predetermined distance and the predetermined time used by the warning determination unit 103.

When the avoidance operation implementation timing has been determined by the control determination unit 104, the control amount calculation unit 105 calculates a control amount of the electric power steering (EPS) 12 and the electronically controlled brake (ECB) 13, and controls the electric power steering (EPS) 12 and the electronically controlled brake (ECB) 13 in accordance with the calculated control amount and the avoidance operation implementation timing determined by the control determination unit 104.

Figure 6:
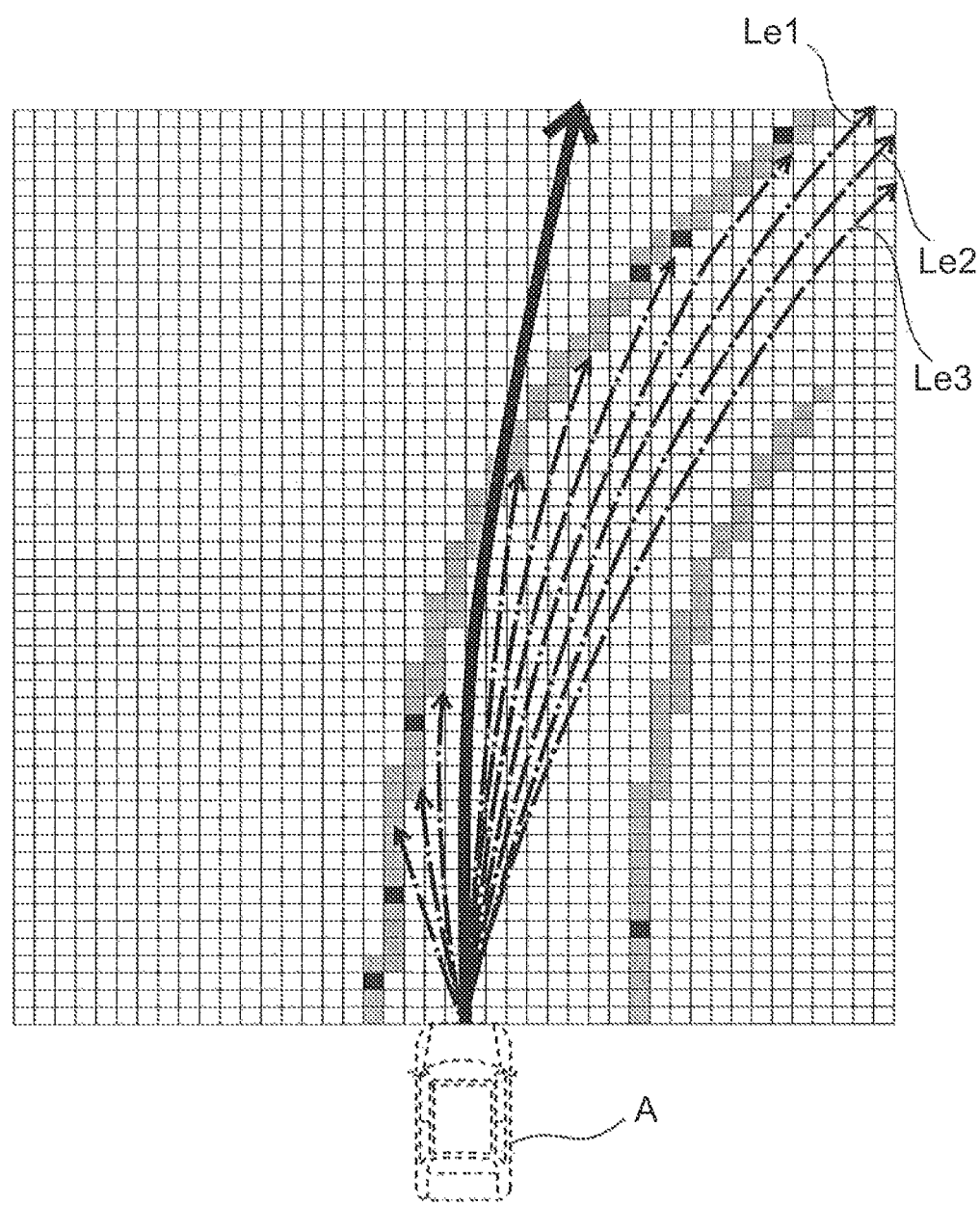
FIG. 6 is a view showing a method of specifying an avoidance line.

More specifically, the control amount calculation unit 105 specifies an avoidance line on which a collision between the host vehicle and the three-dimensional object can be avoided. A method of specifying the avoidance line will now be described on the basis of FIGS. 6 to 8. The control amount calculation unit 105 determines a plurality of routes (indicated by dot-dash line arrows in FIG. 6) along which the host vehicle is predicted to travel when the steering angle of the host vehicle is varied in increments of a predetermined amount. Here, the "predetermined amount" corresponds to a minimum amount by which the ECU 1 can control the steering angle.

Figure 7:
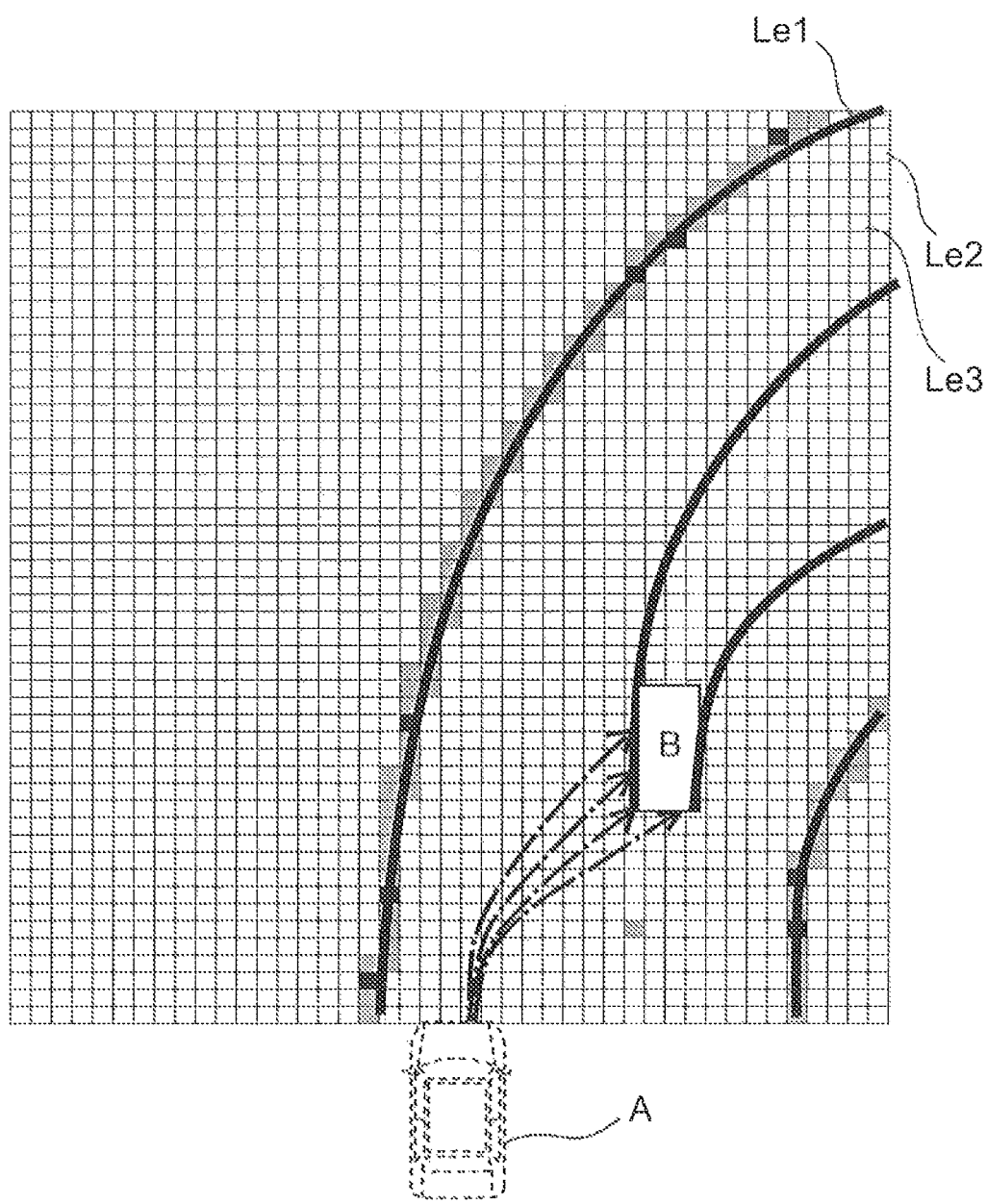
FIG. 7 is a view showing an example of routes excluded from avoidance line selection choices.

The control amount calculation unit 105 selects routes (Le1, Le2, Le3 in FIG. 6) that do not pass through the avoidance region, from among the plurality of routes, as avoidance lines. It is assumed at this time that the control amount calculation unit 105 excludes a route that passes through the unclear region for a distance exceeding a threshold (or a route that passes through the cells of the unclear region a number of times exceeding a threshold) from the avoidance line selection choices. As shown in FIG. 7, for example, when recognition of a three-dimensional object B existing on a branch part of the road is missed, routes colliding with the three-dimensional object B (indicated by dot-dash line arrows in FIG. 7) are excluded from the avoidance line selection choices.

Further, when a plurality of routes that do not pass through either the avoidance region or the unclear region exist, the control amount calculation unit 105 may select a route (Le1 in FIG. 6) on which an amount of variation from the current steering angle is smallest. Note that when a movement cost is set for each cell of the grid map, the control amount calculation unit 105 may calculate a total movement cost of all of the cells through which each of the plurality of routes passes, and select the route on which the calculated total movement cost is smallest. Here, the "movement cost" is a value determined in accordance with a degree of danger involved in travel through each cell. For example, the movement cost of a cell in the avoidance region is set at a greater value than the movement cost of a cell in the unclear region, and the movement cost of a cell in the unclear region is set at a greater value than the movement cost of a cell in the safe region. Note that the movement cost of the unclear region may be modified in accordance with a size of the cell. For example, the movement cost of the unclear region may be set to be larger when the size of the cell is large than when the size of the cell is small. The reason for this is that when the size of the cell is large, the possibility of a three-dimensional object existing with a single cell range is higher than when the size of the cell is small. It is assumed that the movement cost is set when the travel path recognition unit 100 creates the grid map.

Figure 8:
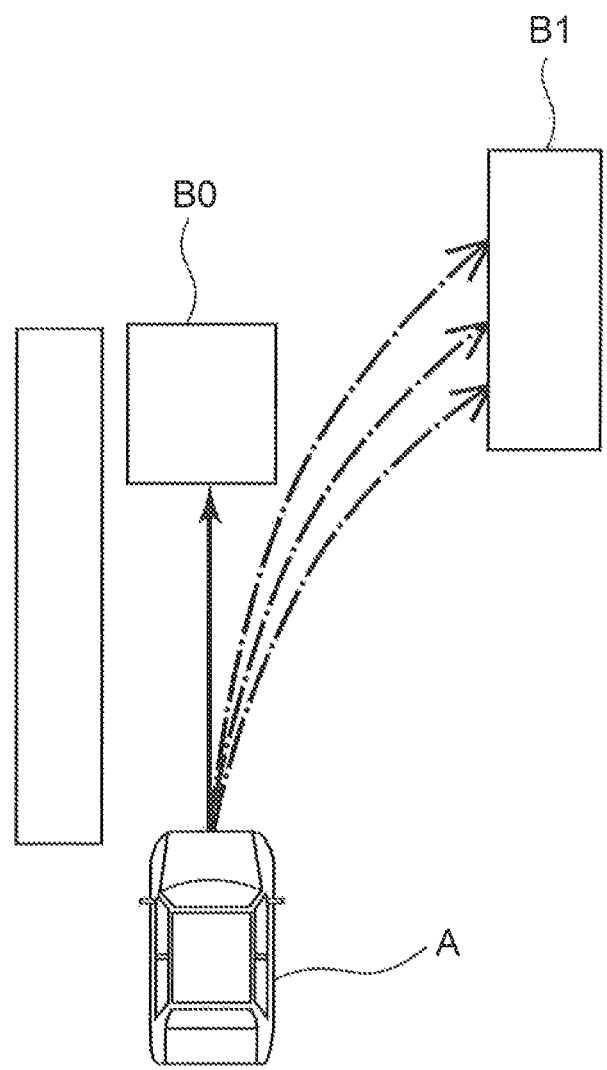
FIG. 8 is a view showing another method of specifying the avoidance line.

Incidentally, it may be necessary in certain cases to select a route on which a collision with another three-dimensional object may occur as the avoidance line for avoiding the three-dimensional object existing on the advancement path of the host vehicle. As shown in FIG. 8, for example, a case in which all routes (indicated by dot-dash line arrows in FIG. 8) for avoiding a three-dimensional object B0 existing on the advancement path (indicated by a solid line arrow in FIG. 8) of the host vehicle A collide with another three-dimensional object B1 may be envisaged. In such a case, the control amount calculation unit 105 may select a route on which the distance to the other three-dimensional object B1 is longest, from among the routes for avoiding the three-dimensional object B0, as the avoidance line. When the avoidance line is selected using this method, sufficient leeway to specify an avoidance line for avoiding the three-dimensional object B1 after avoiding the three-dimensional object B0 is obtained, and the driver is provided with sufficient leeway to perform a driving operation for avoiding the three-dimensional object B1. Alternatively, the driver or the ECU 1 can reduce damage incurred in a collision between the host vehicle and the three-dimensional object B1 by operating the electronically controlled brake (ECB) 13 after avoiding the three-dimensional object B0.

Here, the control amount calculation unit 105 corresponds to assisting means according to the invention.

With the ECU 1 configured as described above, implementation of driving assistance that guides the host vehicle to a region in which the presence of a three-dimensional object is unclear can be avoided to a maximum extent. As a result, situations in which the host vehicle is guided to an avoidance line on which a collision occurs with a three-dimensional object not recognized by the environment recognition device 2 can be suppressed as far as possible.

Figure 9:
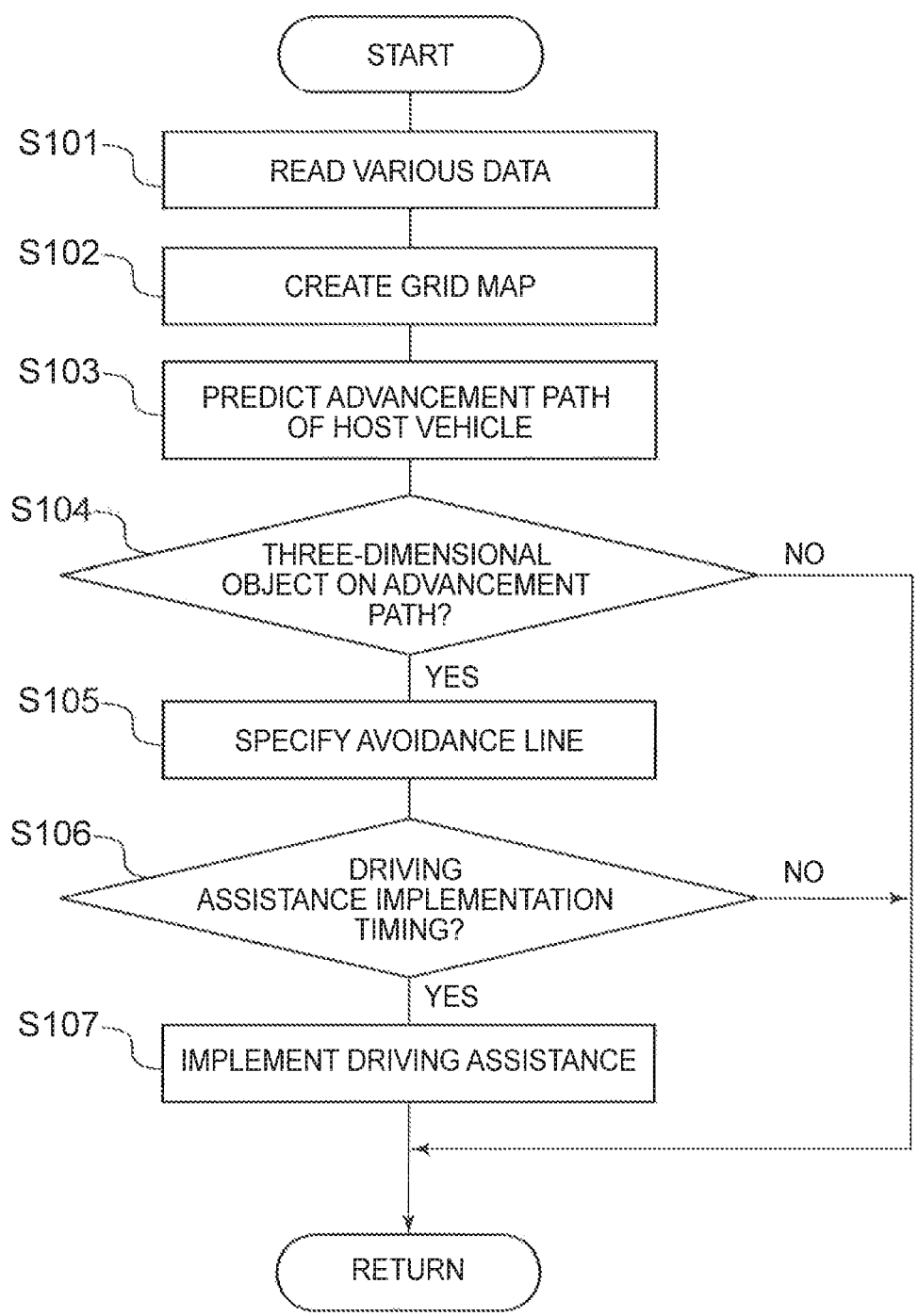
FIG. 9 is a flowchart showing procedures for executing driving assistance.

Procedures for executing driving assistance according to this embodiment will be described below using FIG. 9. FIG. 9 shows a processing routine that is executed repeatedly by the ECU 1 and stored in the ROM or the like of the ECU 1 in advance.

In the processing routine of FIG. 9, first, in S101, the ECU 1 reads the output signal from the environment recognition device 2, the output signal (the yaw rate y) from the yaw rate sensor 3, the output signal (the vehicle speed V) from the vehicle wheel speed sensor 4, the output signal (a steering angle θ) from the steering angle sensor 8, and so on.

In S102, the ECU 1 generates a grid map on the basis of the output signal from the environment recognition device 2. More specifically, as described above with reference to FIG. 2, the ECU 1 sets cells in positions where a three-dimensional object exists as the avoidance region and cells between the three-dimensional object and the host vehicle as the safe region on a two-dimensional grid map. The ECU 1 may also set the movement cost of each cell.

In S103, the ECU 1 predicts (calculates) the advancement path of the host vehicle on the basis of the yaw rate y and the vehicle speed V.

In S104, the ECU 1 determines whether or not a three-dimensional object exists on the advancement path of the host vehicle on the basis of the grid map generated in S102 and the advancement path predicted in S103. When the determination of S104 is negative, the ECU 1 terminates execution of the current routine. When the determination of S104 is affirmative, on the other hand, the ECU 1 advances to S105.

In S105, the ECU 1 specifies an avoidance line for avoiding the three-dimensional object. More specifically, first, the ECU 1 calculates a plurality of routes along which the host vehicle is predicted to travel when the steering angle θ read in S101 is varied in increments of a predetermined amount. The ECU 1 then sets a route that does not pass through either the avoidance region or the unclear region, from among the plurality of routes, as the avoidance line. When the movement costs of the respective cells of the grid map have been set, the ECU 1 calculates the respective total movement costs of the plurality of routes and selects the route having the smallest total movement cost as the avoidance line. Note that when a plurality of routes that do not pass through either the avoidance region or the unclear region or a plurality of routes having the smallest total movement cost exist, the ECU 1 may select the route on which the amount of variation from the current steering angle θ is smallest as the avoidance line.

In S106, the ECU 1 determines whether or not a driving assistance implementation timing has arrived. More specifically, the ECU 1 determines whether or not the distance between the host vehicle and the three-dimensional object has fallen to or below the predetermined distance, or whether or not the time required for the host vehicle to reach the three-dimensional object is equal to or smaller than the predetermined time. When the determination of S106 is negative, the ECU 1 terminates execution of the current routine. When the determination of S106 is affirmative, on the other hand, the ECU 1 advances to S107.

In S107, the ECU 1 controls the electric power steering (EPS) 12 to cause the host vehicle to travel along the avoidance line selected in S105. More specifically, the ECU 1 controls the electric power steering (EPS) 12 such that the steering angle θ matches a steering angle corresponding to the avoidance line.

By implementing driving assistance using the method described above, a situation in which driving assistance is implemented following a missed recognition by the environment recognition device 2, with the result that the host vehicle collides with another three-dimensional object, can be avoided. As a result, an improvement in the safety of driving assistance implementation can be achieved.

| | |
|---|---|
| 1 | ECU |
| 2 | environment recognition device |
| 3 | yaw rate sensor |
| 4 | vehicle wheel speed sensor |
| 5 | acceleration sensor |
| 6 | brake sensor |
| 7 | accelerator sensor |
| 8 | steering angle sensor |
| 9 | steering torque sensor |
| 10 | buzzer |
| 11 | display device |
| 12 | electric power steering (EPS) |
| 13 | electronically controlled brake (ECB) |
| 100 | travel path recognition unit |
| 101 | advancement path prediction unit |
| 102 | assistance determination unit |
| 103 | warning determination unit |
| 104 | control determination unit |
| 105 | control amount calculation unit |

The invention claimed is:

1. A vehicle driving assistance system comprising:
a recognizing unit configured to recognize a three-dimensional object existing on a periphery of a host vehicle and generate information relating to relative positions of the three-dimensional object and the host vehicle;
a setting unit configured to set, on the basis of the information generated by the recognizing unit, a grid map indicating relative positions of a current position of the host vehicle, an avoidance region, which is recognized as a region in which the three-dimensional object exists, a safe region, which is recognized as a region in which no three-dimensional objects exist, and an unclear region, which is a region the recognizing unit cannot perceive; and
an assisting unit configured to
determine that implementation of a driving assist is required, when an advancement path of the host vehicle passes through the avoidance region on the grid map set by the setting unit, specify an avoidance line, which is a route on which the avoidance region can be avoided, on the basis of a distance by which the route passes through the unclear region or the number of times the route passes through a cell of the unclear region, and execute the driving assist by modifying a movement amount of the host vehicle such that the host vehicle travels along the specified avoidance line, wherein the assisting unit is configured to exclude, from avoidance line selection choices, a route that passes through the unclear region for a distance exceeding a threshold, wherein, responsive to detecting a second three-dimensional object, when none of the avoidance line selection choices avoids the second three-dimensional object, the assisting unit is configured to select, from the avoidance line selection choices, a route for the host vehicle to travel to reach the second three-dimensional object, the selected route being the longest length of the avoidance line selection choices, a length of each of the avoidance line selection choices being determined when the avoidance line selection choices are determined.

2. The vehicle driving assistance system according to claim 1, wherein the setting unit is configured to set a movement cost that takes a larger value in the avoidance region than in the unclear region and takes a larger value in the unclear region than in the safe region for each cell of the grid map, and the assisting unit is configured to calculate total movement costs of cells on respective routes along which the host vehicle is predicted to travel when a steering angle of the host vehicle is varied in increments of a predetermined amount, and select a route having the smallest total movement cost as the avoidance line.

3. The vehicle driving assistance system according to claim 2, wherein the assisting unit is configured to exclude a route that passes through the cells of the unclear region a number of times exceeding a threshold, from avoidance line selection choices.

4. The vehicle driving assistance system according to claim 2, wherein, when the presence of the three-dimensional object is unclear or missed by the recognizing unit between the host vehicle and a limit position of a recognition range of the recognizing unit, the setting unit is configured to set cells between the limit position and the host vehicle as the unclear region.

5. The vehicle driving assistance system according to claim 2, wherein, when the three-dimensional object is recognized between the host vehicle and a limit position of a recognition range of the recognizing unit, the setting unit is configured to set cells between the three-dimensional object and the host vehicle as the safe region.

6. The vehicle driving assistance system according to claim 5, wherein the setting unit is configured to set cells between the three-dimensional object and the limit position as the unclear region.

7. The vehicle driving assistance system according to claim 2, wherein the predetermined amount is a minimum amount by which the steering angle can be modified by the assisting unit.

* * * * *